(12) United States Patent
Jhou

(10) Patent No.: US 9,227,369 B2
(45) Date of Patent: Jan. 5, 2016

(54) AIR COMPRESSOR EQUIPMENT FOR VEHICLES

(76) Inventor: Wen-San Jhou, Tainan (TW)

( * ) Notice: Subject to any disclaimer, the term of this patent is extended or adjusted under 35 U.S.C. 154(b) by 0 days.

(21) Appl. No.: 14/378,961

(22) PCT Filed: Feb. 16, 2012

(86) PCT No.: PCT/CN2012/071180
§ 371 (c)(1),
(2), (4) Date: Nov. 18, 2014

(87) PCT Pub. No.: WO2013/120261
PCT Pub. Date: Aug. 22, 2013

(65) Prior Publication Data
US 2015/0059921 A1    Mar. 5, 2015

(51) Int. Cl.
*B65B 31/00* (2006.01)
*B29C 73/16* (2006.01)
*F04B 35/06* (2006.01)
*B60C 29/06* (2006.01)
*B29L 30/00* (2006.01)

(52) U.S. Cl.
CPC ............... *B29C 73/166* (2013.01); *F04B 35/06* (2013.01); *B29L 2030/00* (2013.01); *B60C 29/062* (2013.04)

(58) Field of Classification Search
CPC ..... B29C 73/025; B29C 73/166; B60C 29/062
USPC ..................... 141/38, 313, 104, 105; 137/223
See application file for complete search history.

(56) References Cited

U.S. PATENT DOCUMENTS

2002/0121331 A1* 9/2002 Gerresheim et al. .......... 156/115
2003/0047652 A1* 3/2003 Eckhardt ....................... 248/121

* cited by examiner

Primary Examiner — Jason K Niesz

(57) ABSTRACT

The present invention discloses air compressor equipment for vehicles and, more particularly, a sealant dispensing unit that can work under upright orientation as well as inverted orientation so as to repair and inflate a punctured tire. The sealant dispensing unit has a first hose connector and a second hose connector. In use, the sealant dispensing unit allows a user to select upright orientation or inverted orientation for an operation, whereby the hose connectors of the sealant dispensing unit may serve as a channel for receiving the high-pressure air or serve as a channel for delivering the chemical sealant. A professional can perform a box design in cooperation with the sealant dispensing unit easily.

3 Claims, 13 Drawing Sheets

AIR COMPRESSOR EQUIPMENT FOR VEHICLES

BACKGROUND OF THE INVENTION

1. Technical Field of the Invention

The present invention relates to air compressor equipment for vehicles and, more especially, to air compressor equipment that can repair and inflate punctured tires of vehicles.

2. Description of the Prior Art

Conventional sealant dispenser generally includes a cap, a bottle, and a tube. The bottle contains the chemical sealant that can be used to repair a tire. The cap is provided with two hose connectors, one of which is used for receiving the high-pressure air generated by an air compressor, and the other one of which is used for delivering the chemical sealant. The tube is fitted into the cap, so that when the cap is combined with the bottle, the tube will be inserted into the bottle.

Currently, among the existing equipment for repairing tires, some equipment uses a box, being furnished with an air compressor therein, and a separate sealant dispenser in cooperation with the box. If a tire required to be repaired, the user can connect a first hose, which is attached with an inlet of the sealant dispenser, to an air outlet of the box and can connect a second hose, which is attached with an outlet of the sealant dispenser, to an air nozzle of a punctured tire. After starting the air compressor of the box, the chemical sealant contained in the bottle of the dispenser can be delivered to the punctured tire for a repair. This kind of separate box design only allows the sealant dispenser to be installed in one orientation for an application; namely, the sealant dispenser can only work under upright orientation or it can only work under inverted orientation, but it cannot work under upright orientation as well as inverted orientation. The term "upright orientation" means that the bottom of the bottle of the sealant dispenser faces downwardly while the cap of the bottle of the sealant dispenser faces upwardly when operating the dispenser. The term "inverted orientation" means that the bottom of the bottle of the sealant dispenser faces upwardly while the cap of the bottle of sealant dispenser faces downwardly when operating the dispenser.

EP1605162A2 disclosed an invention, wherein the box and the sealant dispenser are separate. The bottom of the bottle of the sealant dispenser faces upwardly, and the sealant dispenser can only work under inverted orientation. Such design has some shortcomings. One shortcoming is that the sealant dispenser is attached with two hoses, which may cause inconvenience in storing the dispenser. Another shortcoming is that the two hoses are not easy to be distinguished by users for a correct connection. A further shortcoming is that the sealant dispenser is easy to tip over while in operation.

WO2004/039567A1 disclosed an invention, wherein the sealant dispenser is positioned at a box and operated under upright orientation, but it cannot work under inverted orientation.

WO2003/004328A1 disclosed a sealant dispenser, which can be operated under inverted orientation, but it cannot work under upright orientation.

WO2009/119317A1 and WO2005/084968A2 disclosed inventions, wherein the sealant dispenser is installed to a box and only works under inverted orientation.

U.S. Pat. No. 7,178,564B2 disclosed an invention relating to a sealant dispenser that only works under a specific orientation (for supplying the chemical sealant, but not for reclaiming the chemical sealant).

U.S. Pat. No. 7,021,348B2, US2008/0098855A1, and WO2003/041949A1 disclosed inventions, wherein the sealant dispenser is operated under horizontal orientation (the bottle and the cap are parallel to the ground surface).

In view of the prior-art technology, all the conventional sealant dispensers cannot work under upright orientation as well as inverted orientation. Besides, the hose connector receiving the high-pressure air and the hose connector delivering the chemical perform their default functions respectively. In other words, the hose connector, which receives the high-pressure air, cannot be used to deliver the chemical sealant. Similarly, the hose connector, which delivers the chemical sealant, cannot be used to receive the high-pressure air.

Accordingly, in view of the shortcomings and inconvenience of the prior-art technology and based on a deep thinking of the related technology, applicant has contrived a piece of air compressor equipment that has an improvement over the prior-art technology.

SUMMARY OF THE INVENTION

One object of the present invention is to provide air compressor equipment for vehicles, which can work under upright orientation as well as inverted orientation to inflate a tire or repair as well as inflate a punctured tire, and thus can afford an associated professional to perform various designs for the supportive box and the sealant dispensing unit of the present invention.

To achieve the above object, applicant provide a technical solution as follows:

Air compressor equipment for vehicles, which comprises:

a supportive box, in which a compressor unit being able to generate high-pressure air is provided; and a sealant dispensing unit including two hose connectors, one of which is provided to receive the high-pressure air generated by the compressor unit and the other one of which is provided to convey the chemical sealant contained in the sealant dispensing unit to an object, whereby the sealant dispensing unit allows a user to select upright orientation or inverted orientation for an operation.

The sealant dispensing unit further includes a tube which serves as a channel for the high-pressure air generated by the compressor unit or serves as a channel for the chemical sealant contained in the sealant dispensing unit depending on the sealant dispensing unit being operated under upright or inverted orientation Each of the two hose connectors can be used as an inlet for the high-pressure air generated by the compressor unit or used as an outlet for the chemical sealant contained in the sealant dispensing unit depending on the sealant dispensing unit being operated under upright or inverted orientation.

The sealant dispensing unit further includes a bottle and a cap. The bottle has a top opening and a bottom. The bottle defines therein an inner space for storing the chemical sealant that is used to repair a tire. The cap, which is able to combine with the bottle, has a lower cylindrical pipe extending downwardly and an upper cylindrical pipe extending upwardly, wherein the lower cylindrical pipe communicates with the upper cylindrical pipe. The lower cylindrical pipe defines multiple slots around its periphery. The lower cylindrical pipe is provided at its bottom with a circular bottom wall extending inwardly along a radial direction of the lower cylindrical pipe, wherein the cylindrical bottom wall defines a central circular opening communicating an inner passage of the lower cylindrical pipe. The upper cylindrical upper pipe has a top opening and is provided with the two hose connectors consisting of a first hose connector and a second hose connector. The sealant dispensing unit further includes a spring, which is inserted through the top opening of the upper cylindrical pipe and placed on the circular bottom wall at the bottom of the inner passage of the lower cylindrical pipe. The sealant dispensing unit further includes a tube with a predetermined length and an inner passage. The tube has a top segment provided with a closed top face and has a bottom segment defining a bottom opening, wherein the top segment has a greater diameter than the bottom segment of the tube. The bottom segment defines multiple notches around its bottom periphery. In addition, the tube is provided with two upper, spaced-apart, annular protrusions and two lower, spaced-apart, annular protrusions between the top segment and the bottom segment, wherein the upper and lower annular protrusions has a greater diameter than the bottom segment of the tube. Between the top segment and the upper annular protrusions defines a first annular slot which has a smaller diameter than the bottom segment of the tube. The tube defines at the first annular slot a through hole by which the inner passage of the tube communicates with first annular slot. Between the upper annular protrusions and the lower annular protrusions defines a second annular slot which has a smaller diameter than the bottom segment of the tube. Between the two upper annular protrusions is provided with a first seal ring. Between the two lower annular protrusions is provided with a second seal ring. The bottom segment of the tube is inserted to go through the top opening of the upper cylindrical pipe and go out of the central circular opening of the circular bottom wall of the lower cylindrical pipe so that the lower annular protrusions of the tube urge against a top end of the spring and thus located in the upper cylindrical pipe and the lower cylindrical pipe, so that between the cap and the first annular slot of the tube defines a first annular gap whereas between the cap and the second annular slot of the tube defines a second annular gap, wherein both of the first and second annular gaps are displaceable with the tube. The sealant dispensing unit further includes a serving element being pivotally connected with at least one pin hole of the upper cylindrical pipe and urging against the closed top face of the top segment of the tube such that the tube is displaceable by operating the serving element.

The upper cylindrical pipe defines two opposite mounting slots at its top opening, wherein each mounting slot is open at its top and closed at its bottom. Two opposite pin holes are located at the upper cylindrical pipe adjacent to the two mounting slots. One end of the serving element is provided with an eccentric cam having two pivot pins at its two sides. The other end of the serving element is provided with an operating handle. The serving element is pivotally connected with the pin holes of the upper cylindrical pipe by the pivot pins. The eccentric cam of the serving element is located at the top opening of the upper cylindrical pipe and urges against the closed top face of the top segment of the tube. As such, the serving element can be operated by the operating handle at the mounting slots of the upper cylindrical pipe to conduct a semicircle swing about the pivot pins.

The supportive box defines a positioning slot, and the bottle of the sealant dispensing unit is provided with an engagement seat engageable with the positioning slot, so that the sealant dispensing unit can be stably installed to the supportive box in upright orientation, wherein a first hose is connected to the first hose connector of the cap for receiving the high-pressure air from the compressor unit, and a second hose is connected to the second hose connector of the cap for conveying the chemical sealant contained in the bottle of the sealant dispensing unit to a punctured tire via the second hose.

One end of the serving element is provided with a pivot pin and a transverse eccentric cam at the rear of the pivot pin; the other end of the serving element is provided with a rotary handle, wherein the pivot pin is pivotally connected to one pin hole of the upper cylindrical pipe.

With the aforementioned structure of the present invention, the functions of the first hose connector and the second hose connector may change. The first hose connector, which receives the high-pressure air when the sealant dispensing unit is operated under upright orientation, will deliver the chemical sealant when the sealant dispensing unit is operated under inverted orientation. The second hose connector, which delivers the chemical sealant when the sealant dispensing unit is operated under upright orientation, will receive the high-pressure air when the sealant dispensing unit is operated under inverted orientation. Furthermore, the tube, which serves as a channel for the chemical sealant when the sealant dispensing unit is operated under upright orientation, will serve as a channel for the high-pressure air when the sealant dispensing unit is operated under inverted orientation. The sealant dispensing unit of the present invention, which can work under upright orientation as well as inverted orientation, can extend and facilitate the cooperation between the supportive box and the sealant dispensing unit to accomplish the purpose of inflating a tire or repairing as well as inflating a punctured tire.

DETAILED DESCRIPTION OF THE PREFERRED EMBODIMENTS

The following paragraphs will illustrate the present invention in more detail with preferred embodiments.

Figure 1:
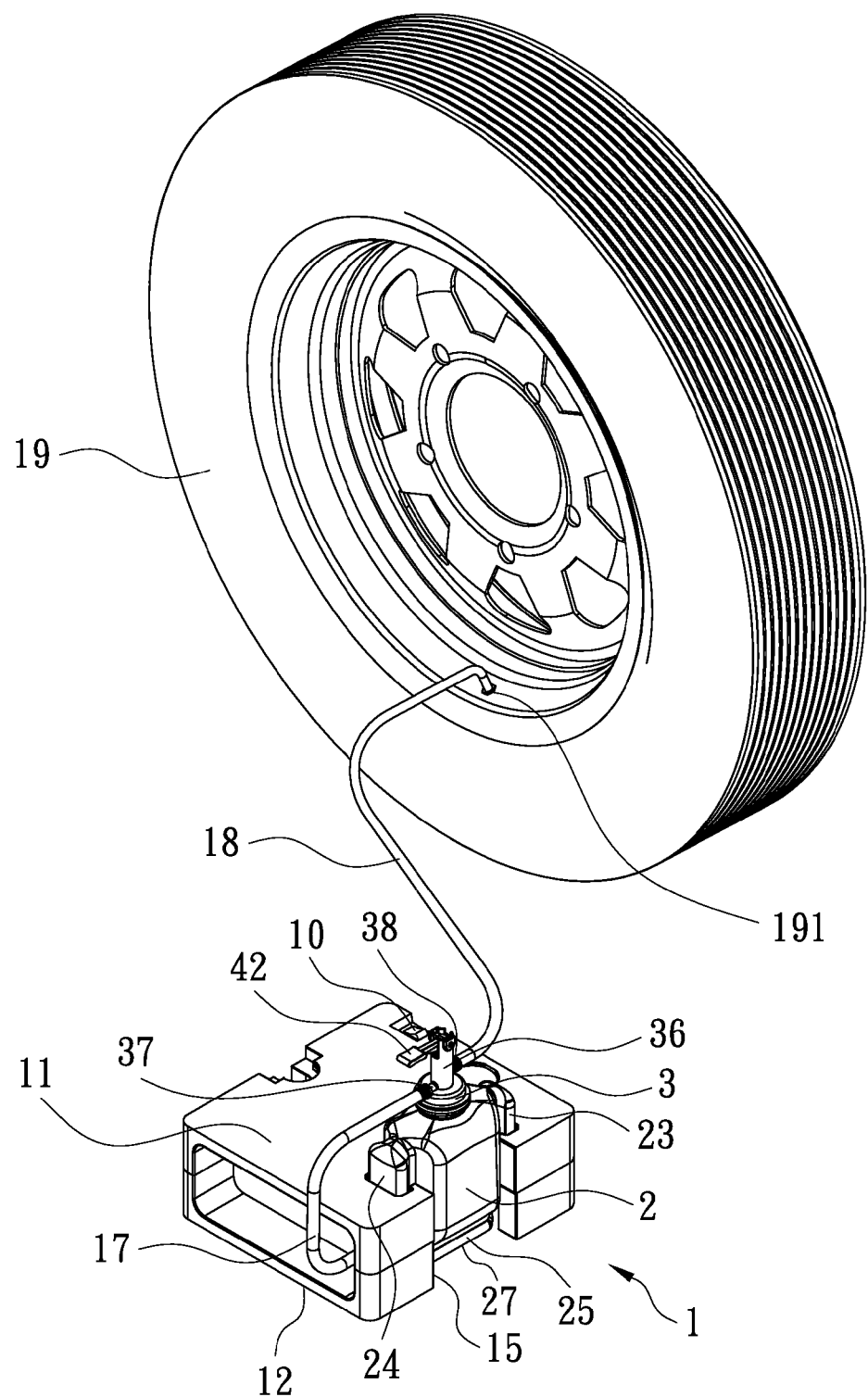
FIG. 1 shows a 3-dimensional application view of the present invention.
Figure 2:
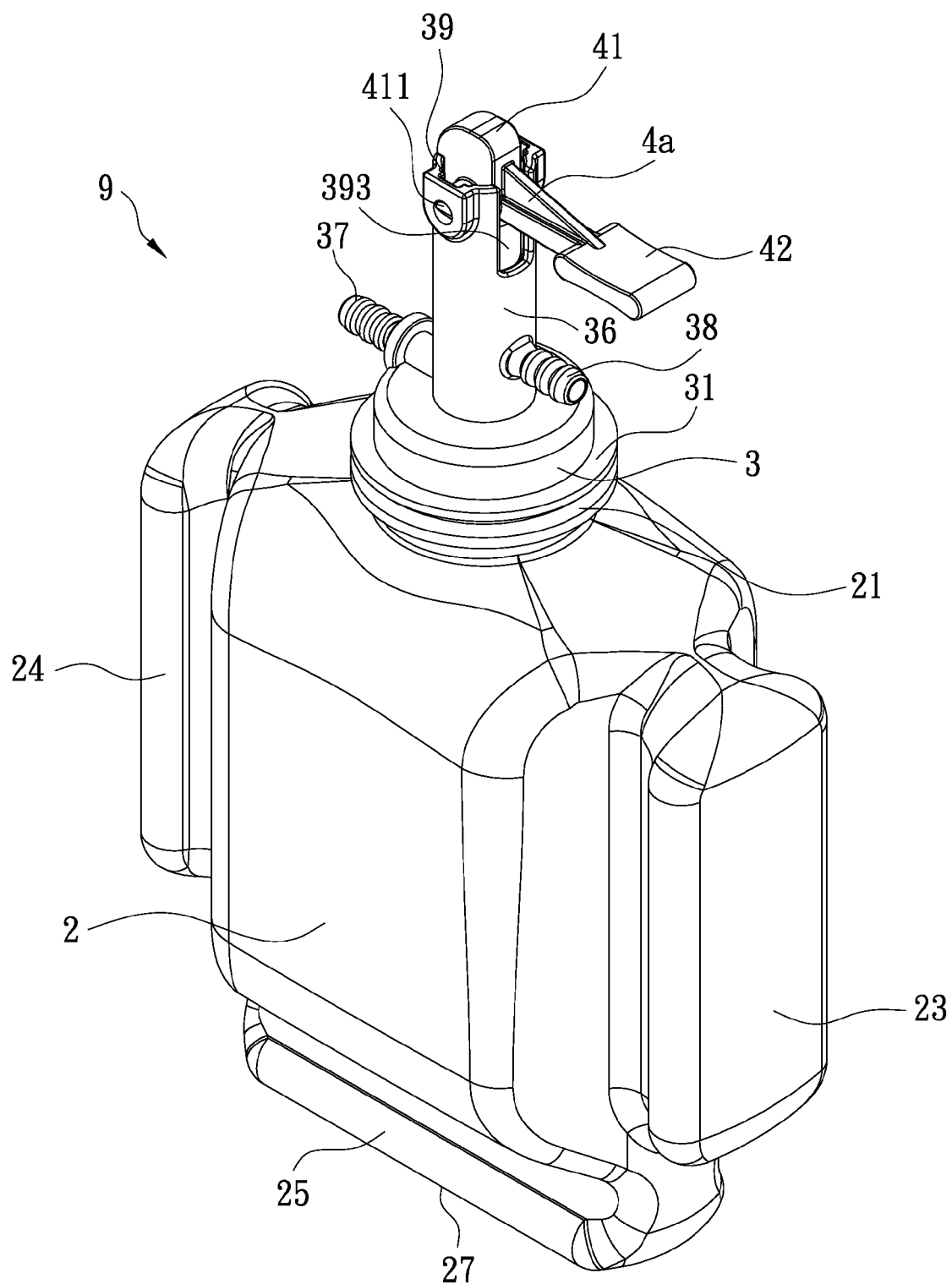
FIG. 2 shows a 3-dimensional view of a sealant dispensing unit of one embodiment of the present invention.

Referring to FIGS. 1 and 2, the air compressor equipment of the present invention generally comprises a supportive box 1 and a sealant dispensing unit 9. The supportive box 1 is substantially rectangular in shape, in which a compressor unit (not shown) being able to generate high-pressure air is provided. The supportive box 1 is provided on its outer surface with a switch 10 that can start and stop the compressor unit. The supportive box 1 defines a positioning slot 15, which is a recessed space. The sealant dispensing unit 9 can be inserted into the positioning slot 15, so that it can be positioned stably and will not tilt or tip over. A first hose 17 has one end being connected to an outlet of the compressor unit (which is related to prior-art technology and not shown in the figures) and has the other end being connected to a first hose connector 37 of the sealant dispensing unit 9. A second hose 18 has one end being connected to a second hose connector 38 of the sealant dispensing unit 9 and has the other end being connected to an air nozzle 191 of a tire 19. When the switch 10 is switched on, the high-pressure air generated by the compressor unit can go through the first hose 17, the interior of the sealant dispensing unit 9, and the second hose 18 to enter the tire 19, thereby inflating the tire 19 or delivering the chemical sealant 26 to repair the tire 19 as well as inflating the tire 19.

Referring to FIGS. 2 through 5, the sealant dispensing unit 9 generally includes a bottle 2, a cap 3, and a tube 5. The bottle 2 has a top opening 21 and a bottom 27. The bottle 2 defines therein an inner space 22 for storing the chemical sealant 26 (see FIGS. 6 and 7). The bottle 2 is provided with engagement seats 23, 24, 25 respectively at its two sides and bottom. The cap 3 can be combined with the top opening 21 of the bottle 2 by thread engagement or thermal bonding. In this embodiment, the cap 3 is connected to the bottle 2 by thermal-bonding the cap flange 31 of the cap 3 with the top opening 21 of the bottle 2. The cap 3 has a lower cylindrical pipe 32 extending downwardly and an upper cylindrical pipe 36 extending upwardly, wherein the lower cylindrical pipe 32 communicates with the upper cylindrical pipe 36. The lower cylindrical pipe 32 defines multiple slots 34 around its periphery. The lower cylindrical pipe 32 is provided at its bottom with a circular bottom wall 33 that extends inwardly along a radial direction of the pipe 32, wherein the circular bottom wall 33 defines a central circular opening 331 communicating the inner passage 35 of the lower cylindrical pipe 32 (see FIGS. 4 and 5). The upper cylindrical upper pipe 36 has a top opening 39 and defines two opposite mounting slots 392, each of which is open in its top and closed in its bottom. Also, the upper cylindrical pipe 36 defines two opposite pin holes 391 adjacent to the two mounting slots 392. Also, the upper cylindrical pipe 36 is provided with the first hose connector 37 and the second hose connector 38, both of which communicates with the inner passage 393 of the upper cylindrical pipe 36.

The sealant dispensing unit 9 further includes a spring 6, which is inserted through the top opening 39 of the upper cylindrical pipe 36 and placed on the circular bottom wall 33 at the bottom of the inner passage 35 of the lower cylindrical pipe 32.

The sealant dispensing unit 9 further includes a tube 5 with a predetermined length and an inner passage 50. The tube 5 generally has a top segment 51 and a bottom segment 59, wherein the top segment 51 is provided with a closed top face 510 and a bottom seal ring 511, and the bottom segment 59 defines a bottom opening 590. The top segment 51 has a greater diameter than the bottom segment 59. The bottom segment 59 defines multiple notches 591 around its bottom periphery. Furthermore, the tube 5 is provided with two upper, spaced-apart, annular protrusions 52 and two lower, spaced-apart, annular protrusions 56 between the top segment 51 and the bottom segment 59, wherein the upper and lower annular protrusions 52, 56 have a greater diameter than the bottom segment 59 of the tube 5. Between the segment 51 and the upper annular protrusions 52 defines a first annular slot 55 which has a smaller diameter than the bottom segment 59 of the tube 5. The tube 5 defines at the first annular slot 55 a through hole 550 by which the inner passage 50 of the tube 5 communicates with the first annular slot 550. Between the upper annular protrusions 52 and the lower annular protrusions 56 defines a second annular slot 58 which has a smaller diameter than the bottom segment 59 of the tube 5. Between the two upper annular protrusions 56 is provided with a first seal ring 53. Between the two lower annular protrusions 56 is provided with a second seal ring 57. The bottom segment 59 of the tube 5 is inserted to go through the top opening 39 of the upper cylindrical pipe 36 and go out of the central circular opening 331 of the circular bottom wall 33. Thereafter, the lower annular protrusions 56 of the tube 5 can urge against a top end of the spring 6 and thus located in the upper cylindrical pipe 36 and the lower cylindrical pipe 32 of the cap 3. Furthermore, between the cap 3 and the first annular slot 55 of the tube 5 defines a first annular gap 301; between the cap 3 and the second annular slot 58 of the tube 5 defines a second annular gap 302; both of the first and second annular gapes 301, 302 are displaceable with the tube 5. The sealant dispensing unit 9 further includes a serving element 4a, wherein one end of the serving element 4a is provided with an eccentric cam 41 having two pivot pins 411 at its two sides, the other end of the serving element 4a is provided with an operating handle 42. The serving element 4a is pivotally connected with the pin holes 391 of the upper cylindrical pipe 36 by the pivot pins 411. The eccentric cam 41 of the serving element 4a is located at the top opening 39 of the upper cylindrical pipe 36 and urging against the closed top face 510 of the top segment 51 of the tube 5. The serving element 4a can be operated by the operating handle 42 at the mounting slots 392 of the upper cylindrical pipe 36 to conduct a semicircle swing about the pivot pins 411.

Figure 4:
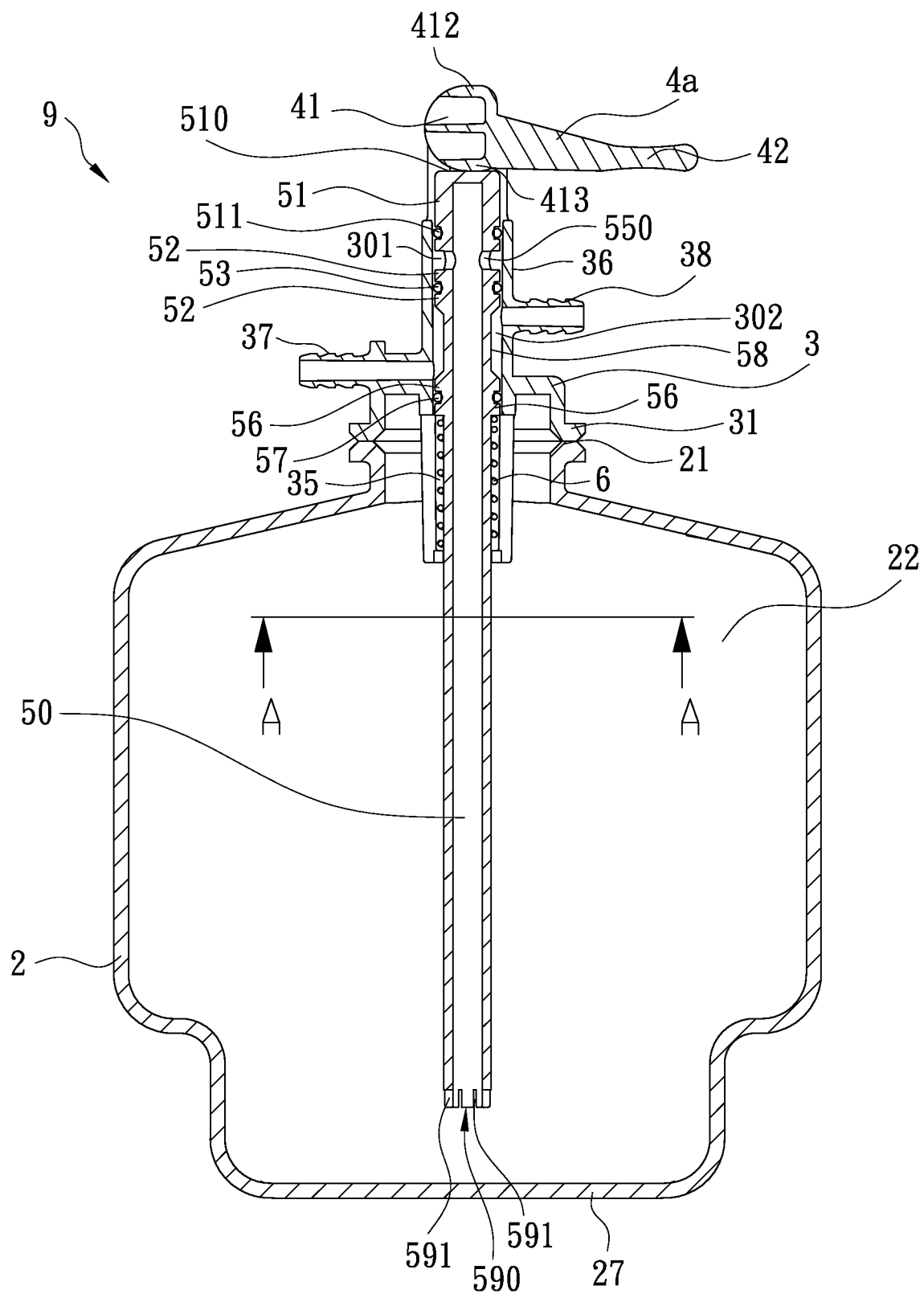
FIG. 4 shows a sectional view of the sealant dispensing unit of the embodiment of the present invention.
Figure 5:
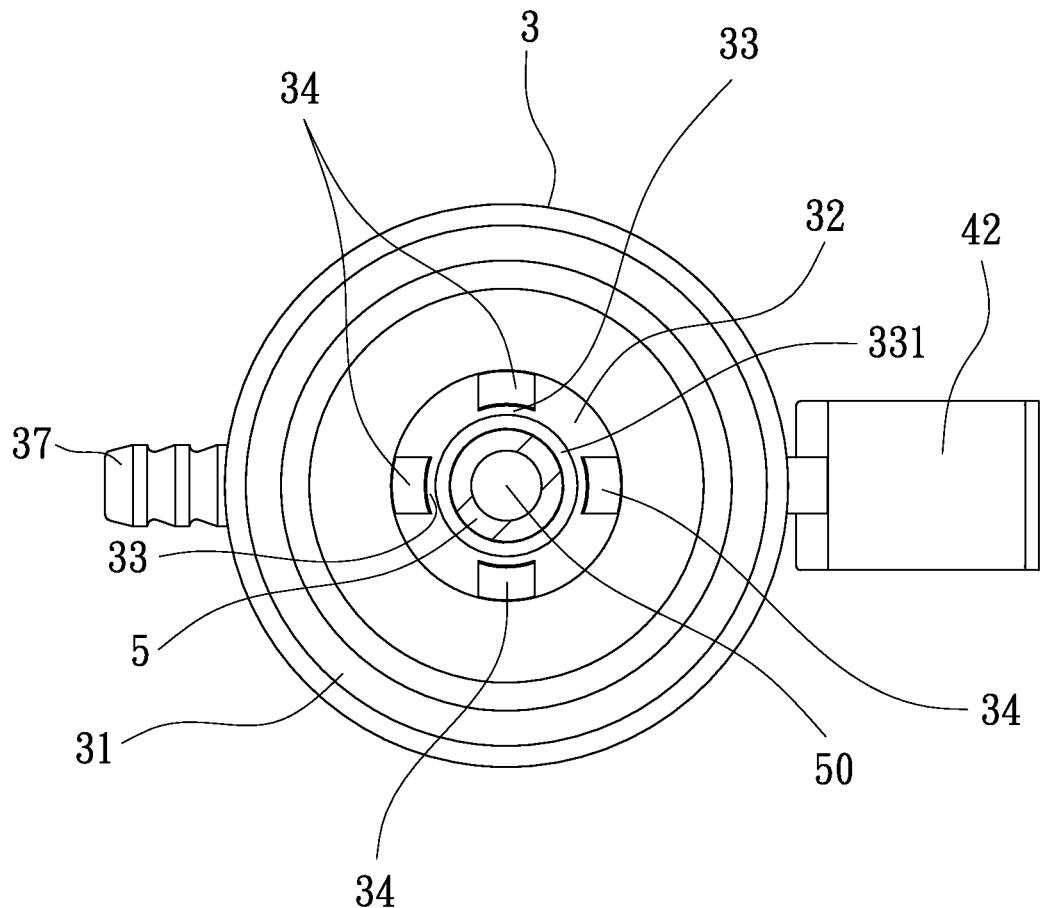
FIG. 5 shows a sectional view taken along line A-A in FIG. 4.

The spring 6, the tube 5, and the serving element 4a can be assembled to the cap 3 to become a cap assembly, which in turn can be assembled to the bottle 2. As such, the lower cylindrical pipe 32 of the cap 3 and the most part of the tube 5, such as the bottom segment 59, are located in the inner space 22 of the bottle 2, as shown in FIGS. 2 and 4.

Figure 8:
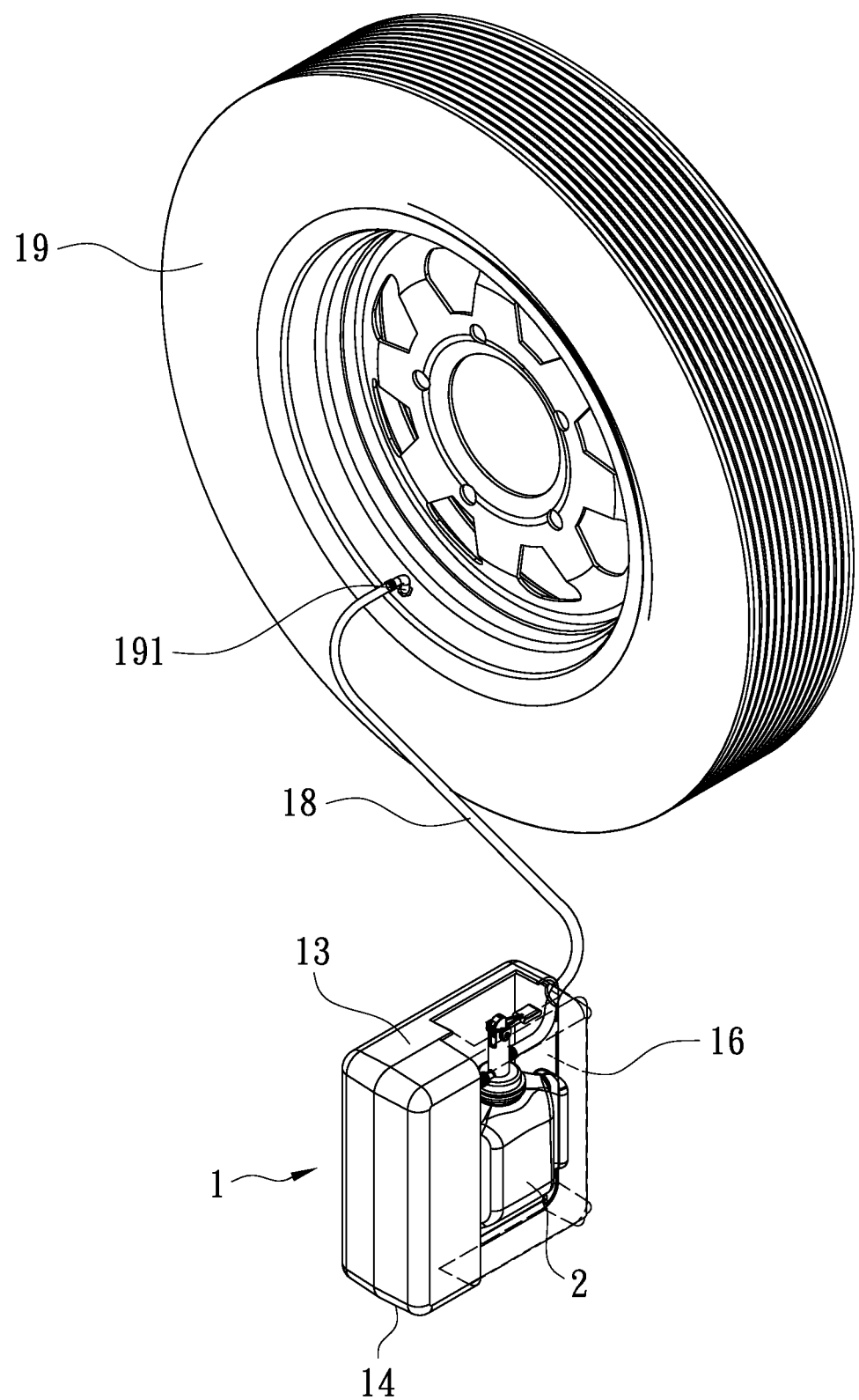
FIG. 8 shows another 3-dimensional application view of the present invention, wherein the sealant dispensing unit of the embodiment is operated under upright orientation
Figure 9:
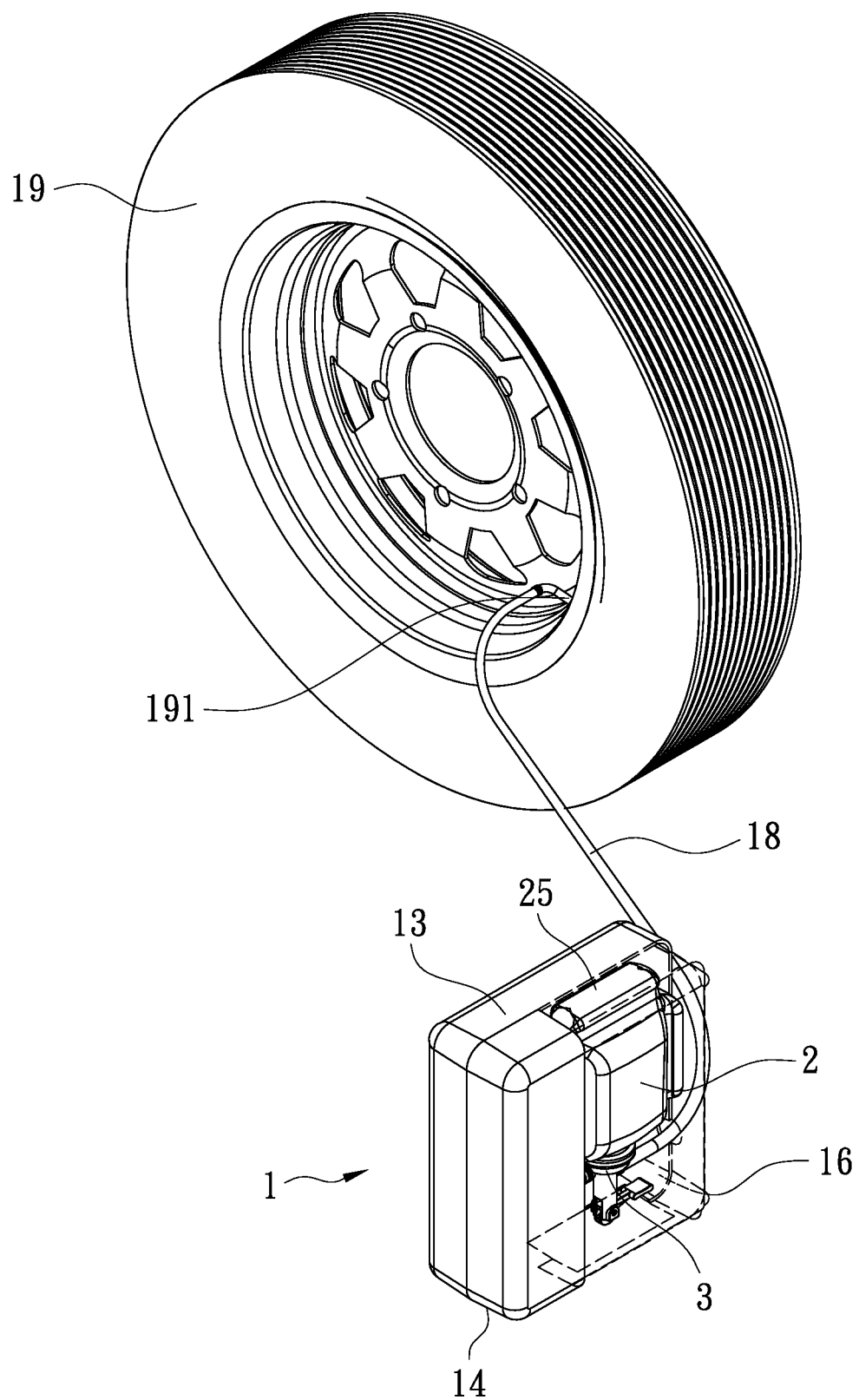
FIG. 9 shows a further 3-dimensional application view of the present invention, wherein the sealant dispensing unit of the embodiment is operated under inverted orientation

In FIG. 1, the supportive box 1, being substantially rectangular in shape, has a large-area top surface 11, a large-area bottom surface 12, and four small-area side surfaces. In another box design, the supportive box 1 has a small-area top surface 13 and a small-area bottom surface 14. (see FIG. 8). The engagement seats 23, 24 of the bottle 2 can be inserted into the positioning slot 15 of the supportive box 1, so that the sealant dispensing unit 9 will not tip over. Under this condition, the sealant dispensing unit 9 is installed in upright orientation. A first hose 17 has one end being connected to the compressor unit and has the other end being connected to the first hose connector 37 of the cap 3 of the sealant dispensing unit 9. A second hose 18 has one end being connected to the second hose connector 38 of the cap 3 of the sealant dispensing unit 9 and has the other end being connected to the air nozzle 191 of the tire 19 that is intended to be inflated or repaired, as shown in FIG. 1. Alternatively, the sealant dispensing unit 9 is installed such that it can be concealed in the positioning slot 16 of the supportive box 1, as shown in FIG. 8. In the present invention, the term "upright orientation" means that the cap 3 of the sealant dispensing unit 9 faces upwardly while the bottom 27 of the bottom 2 faces downwardly; the term "inverted orientation" means that the cap 3 of the sealant dispensing unit 9 faces downwardly while the bottom 27 of the bottle 2 faces upwardly. One feature of the present invention is that the sealant dispensing unit 9 can be installed to the supportive box 1 in upright orientation as well as inverted orientation to achieve the purpose of inflating or repairing a tire. An inverted orientation application for the sealant dispensing unit 9 is shown in FIG. 9. An upright orientation application for the sealant dispensing unit 9 is shown in FIGS. 1 and 8. No matter the sealant dispensing unit 9 is installed in upright or inverted orientation, the sealant dispensing unit 9 can assembled or concealed in the positioning slot 16 of a supportive box that is designed properly.

Figure 6:
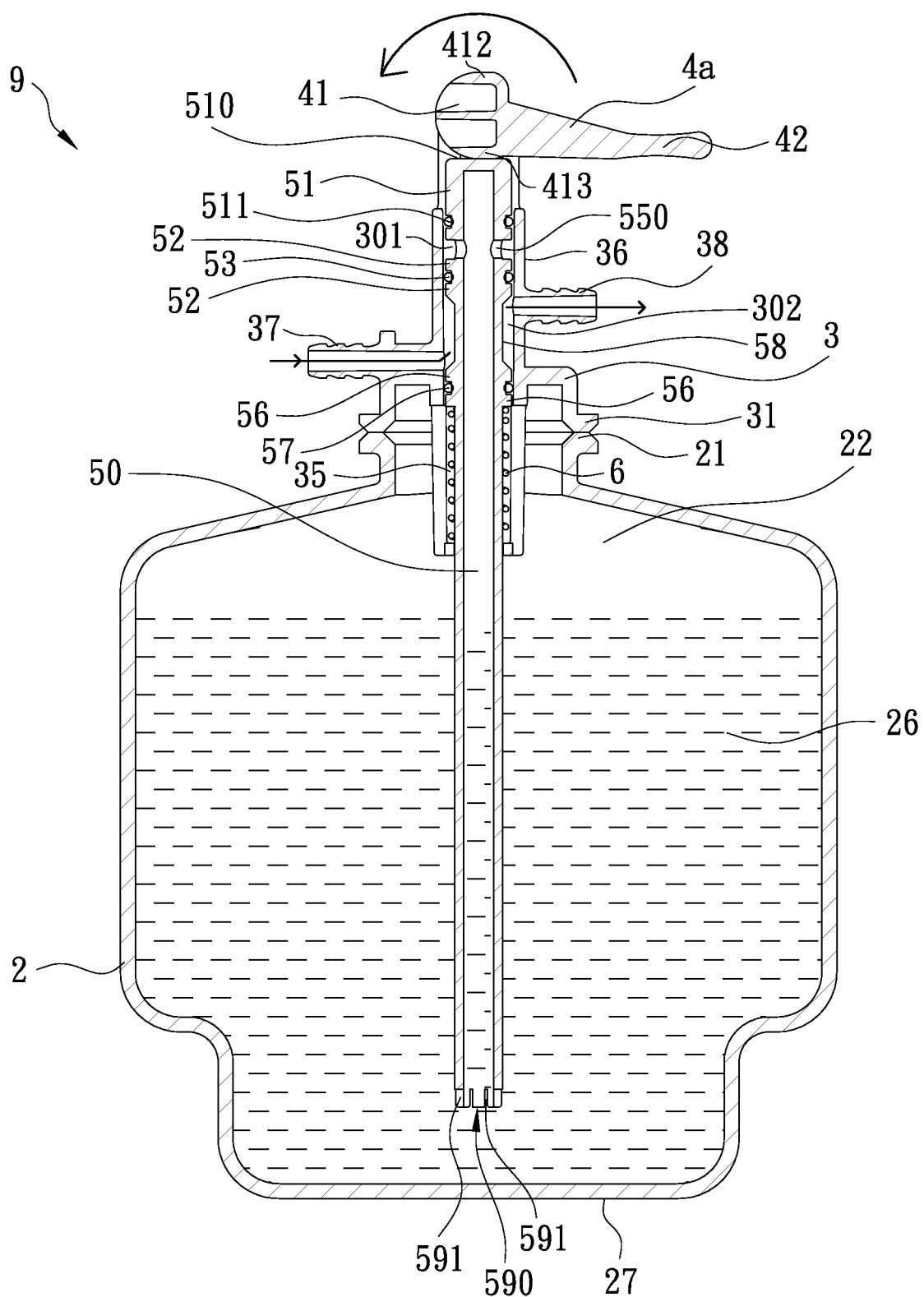
FIG. 6 shows an operational view of the sealant dispensing unit of the embodiment, wherein the sealant dispensing unit is operated under upright orientation and delivering high-pressure air.
Figure 7:
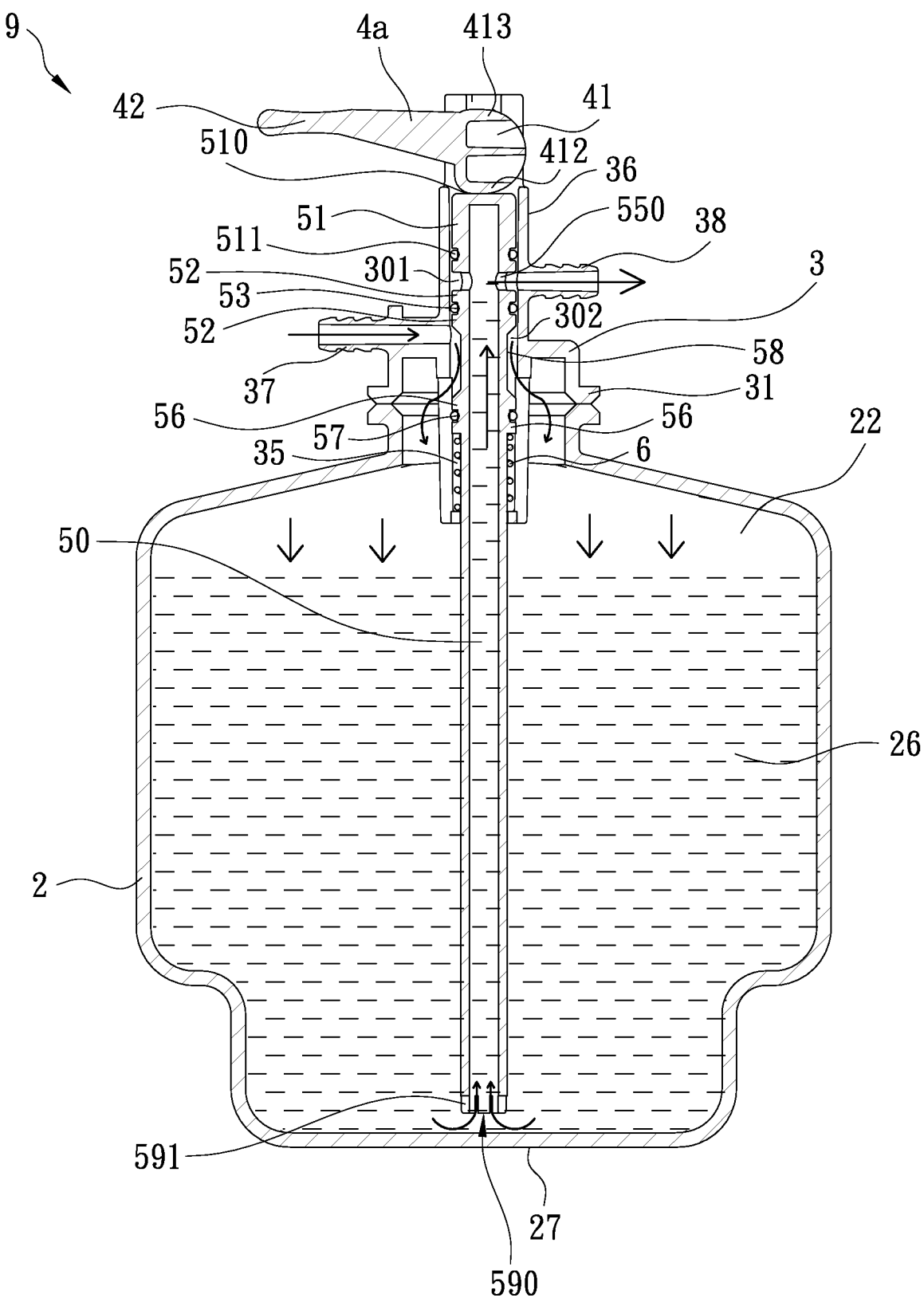
FIG. 7 shows another operational view of the sealant dispensing unit of the present, wherein the dispensing unit is operated under upright orientation and delivering the chemical sealant.

Another feature of the present invention is that the first hose connector 37 and the second hose connector 38 can be changed to serve as an inlet for the high-pressure air from the compressor unit or an outlet for the chemical sealant 26 contained in the sealant dispensing unit 9, depending on the sealant dispensing unit 9 being operated under upright or inverted orientation. FIG. 6 shows that the sealant dispensing init 9 is installed to the supportive box 1 in upright orientation for delivering the high-pressure air. FIG. 7 shows that the sealant dispensing init 9 is installed to the supportive box 1 in upright orientation for delivering the chemical sealant 26. When the surface with short distance 413 of the eccentric cam 41 urges against the closed top face 510 of the top segment 51 of the tube 5, the spring 6 is not compressed and thus the high-pressure air from the compressor unit can go through the first hose 17, the first hose connector 37 to enter the upper cylindrical pipe 36 of the cap 3 such that the high-pressure air can enter the first annular gap 302 between the second annular slot 58 and the cap 3, such that the first hose connector 37 can communicate with the second hose connector 38. Therefore, the second hose connector 38 can deliver the high-pressure air to inflate the tire 19, as shown in FIG. 6. When the tire 19 is punctured and requires to be inflated and repaired, the user can swing the serving element 4a to have the surface with long distance 412 of the eccentric cam 41 come into contact with the closed top face 510 of the top segment 51 of the tube 5, as shown in FIG. 7. Under this condition, the spring 6 is compressed, and thus the tube 5 is displaced downwardly to have the first hose connector 37 being blocked from the second hose connector 38. Therefore, the air entering the first hose connector 37 will be blocked from entering the second hose connector 38. However, the high-pressure air can go through the slots 34 of the lower cylindrical pipe 32, via the second annular gap 302 between the second annular slot 58 and the cap 3, to enter the inner space 22 of the bottle 2. As such, the high-pressure air can force the chemical sealant 26 contained in the bottle 2 to enter the tube 5 via the bottom opening 590 and the notches 591 and go upwardly along the inner passage 50 and go through the through hole 550 and the first annular gap 301 between the first annular slot 55 and the cap 3 to enter the second hose connector 38 so that the chemical sealant 26 can be conveyed to a the for a repair. As shown in FIGS. 6 and 7, when the sealant dispensing unit 9 is installed to the supportive box 1 in upright orientation, the sealant dispensing unit 9 is not only for inflating a tire, but also for repairing a the of being punctured. When repairing a punctured tire is required, the user only requires swinging the serving element 4a. over to the opposite side. When the sealant dispensing unit 9 is operated under upright orientation, the first hose connector 37 only afford the function of receiving the high-pressure air. The inner passage 50 of the tube 5 is only used as a channel for the chemical sealant 26.

Figure 10:
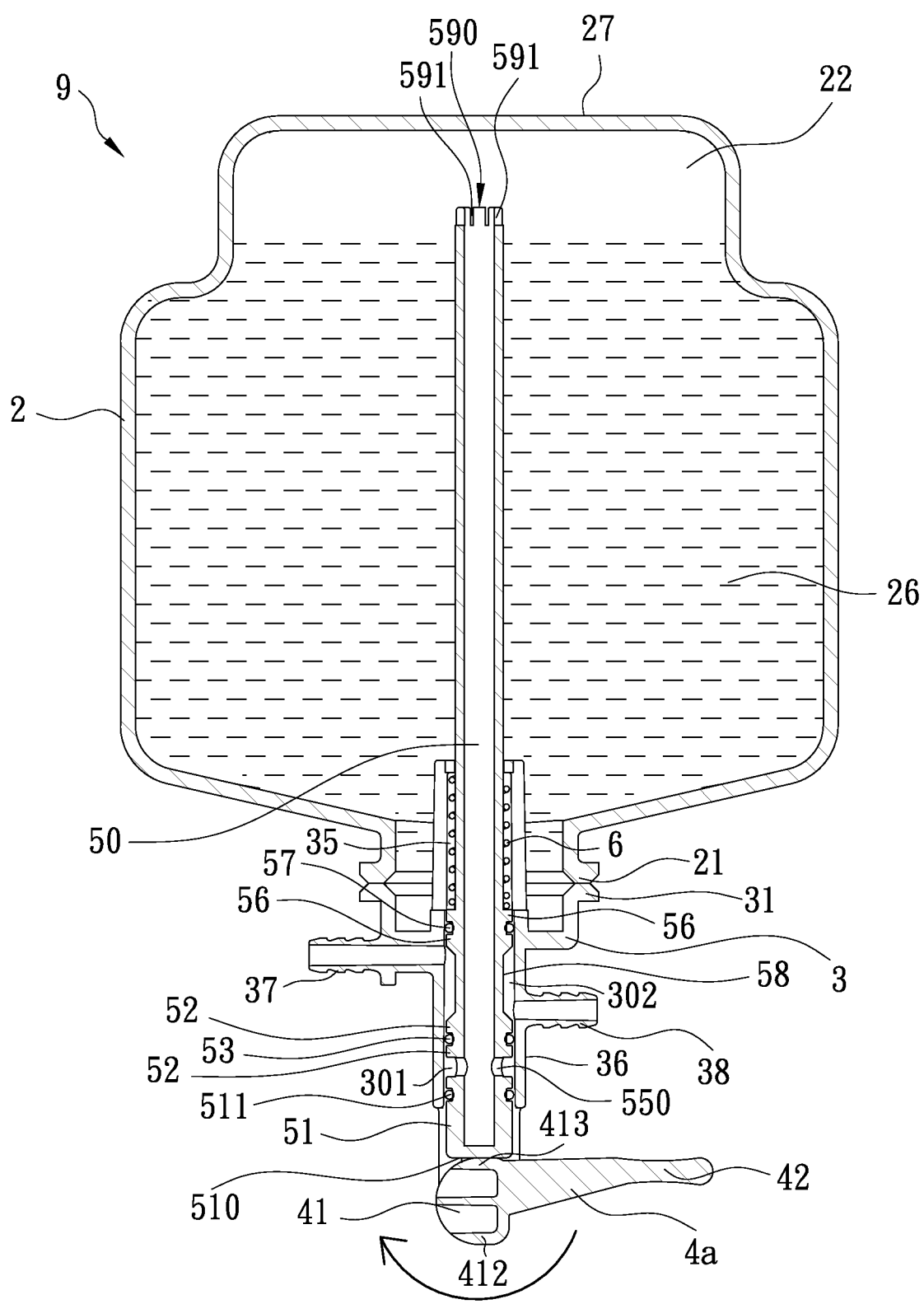
FIG. 10 shows a further operational view of the sealant dispensing unit of the embodiment, wherein the sealant dispensing unit is operated under inverted orientation and delivering the high-pressure air.
Figure 11:
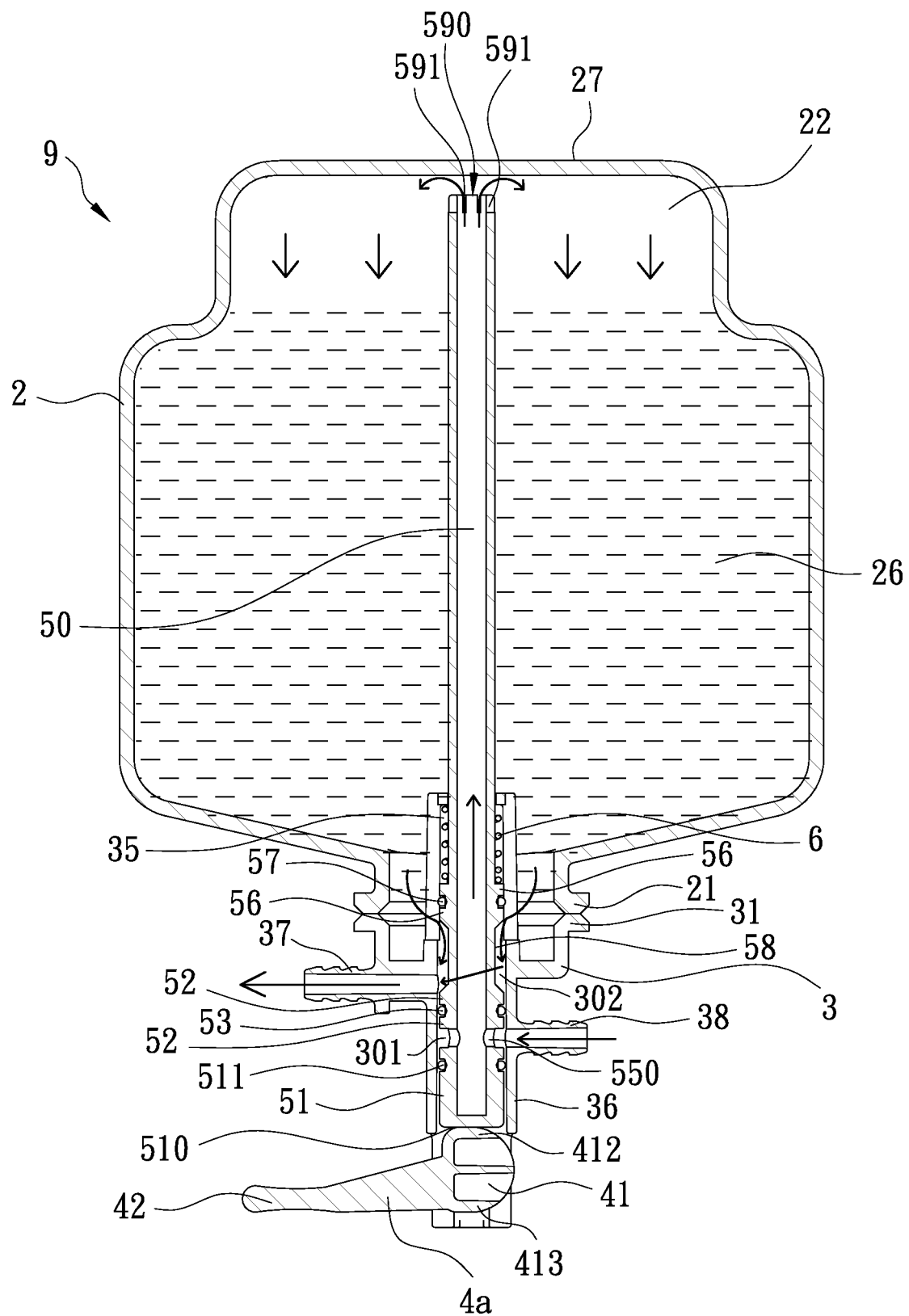
FIG. 11 shows a still further operation view of the sealant dispensing unit of the embodiment, wherein the sealant dispensing unit is operated under inverted orientation and delivering the chemical sealant.

FIGS. 9 through 11 show that the sealant dispensing unit 9 is installed to the supportive box 1 in inverted orientation. As shown, the functions of the first hose connector 37 and the second hose connector 38 have been changed. As shown in FIG. 9, the first hose connector 37, which serves as an inlet for the high-pressure air when the sealant dispensing unit 9 is operated under upright orientation, will now serve as an outlet for the chemical sealant 26; the second connector 38, which serves as an outlet for the chemical sealant 26 when the sealant dispensing unit 9 is operated under inverted orientation, will now serve as an inlet for the high-pressure air; the inner passage 50 of the tube 5, which serves as a channel for the chemical sealant 26 when the sealant dispensing unit 9 is operated under upright orientation, will now serve as a channel for the high-pressure air. Referring to FIG. 10, since the surface of short distance 413 of the eccentric cam 41 urges against the closed top face 510 of the top segment 51 of the tube 5, the spring 6 is not compressed. Under this condition, the second hose connector 38 receiving the high-pressure air and the first hose connector 37 delivering the chemical sealant 26 are located at the region of the second annular gap 302 between the second annular slot 58 of the tube 5 and the cap 3, and thus the second hose connector 38 and the first hose connector 37 can communicate with each other. Therefore, the high-pressure air can enter the second hose connector 38 and go out of the first hose connector 37 to inflate the tire 19. When the tire 19 requires to be repaired, the user can swing the serving element 4a over to the opposite side to have the surface of long distance 412 of the eccentric cam 41 come into contact with the closed top face 510 of the top segment 51 of the tube 5, as shown in FIG. 11. Under this condition, the spring 6 is compressed and thus the tube 5 is displaced upwardly to approach the bottom of the bottle 2. Therefore, the second hose connector 38 is blocked from communicating with the first hose connector 37. However, the high-pressure air entering the second hose connector 38 can go through the through hole 550 to enter the inner passage 50 of the tube 5 and then go into the inner space 22 of the bottle 2 above the chemical sealant 26, and thus the chemical sealant 26 can be forced to go through the slots 34 of the lower cylindrical pipe 32 to enter the second annular gap 302 between the second annular slot 58 and the cap 3 and then go out of the first hose connector 37. In brief, when the sealant dispensing unit 9 is operated under inverted orientation, the first hose connector 37 will provide the function of delivering the chemical sealant 26, which is different from the function of receiving the high-pressure air when the sealant dispensing unit 9 is operated under upright orientation. Furthermore, when the sealant dispensing unit 9 is operated under inverted orientation, the inner passage 50 of the tube 5 will serve as a channel for the high-pressure air, but not serve as a channel for the chemical sealant 26.

Figure 3:
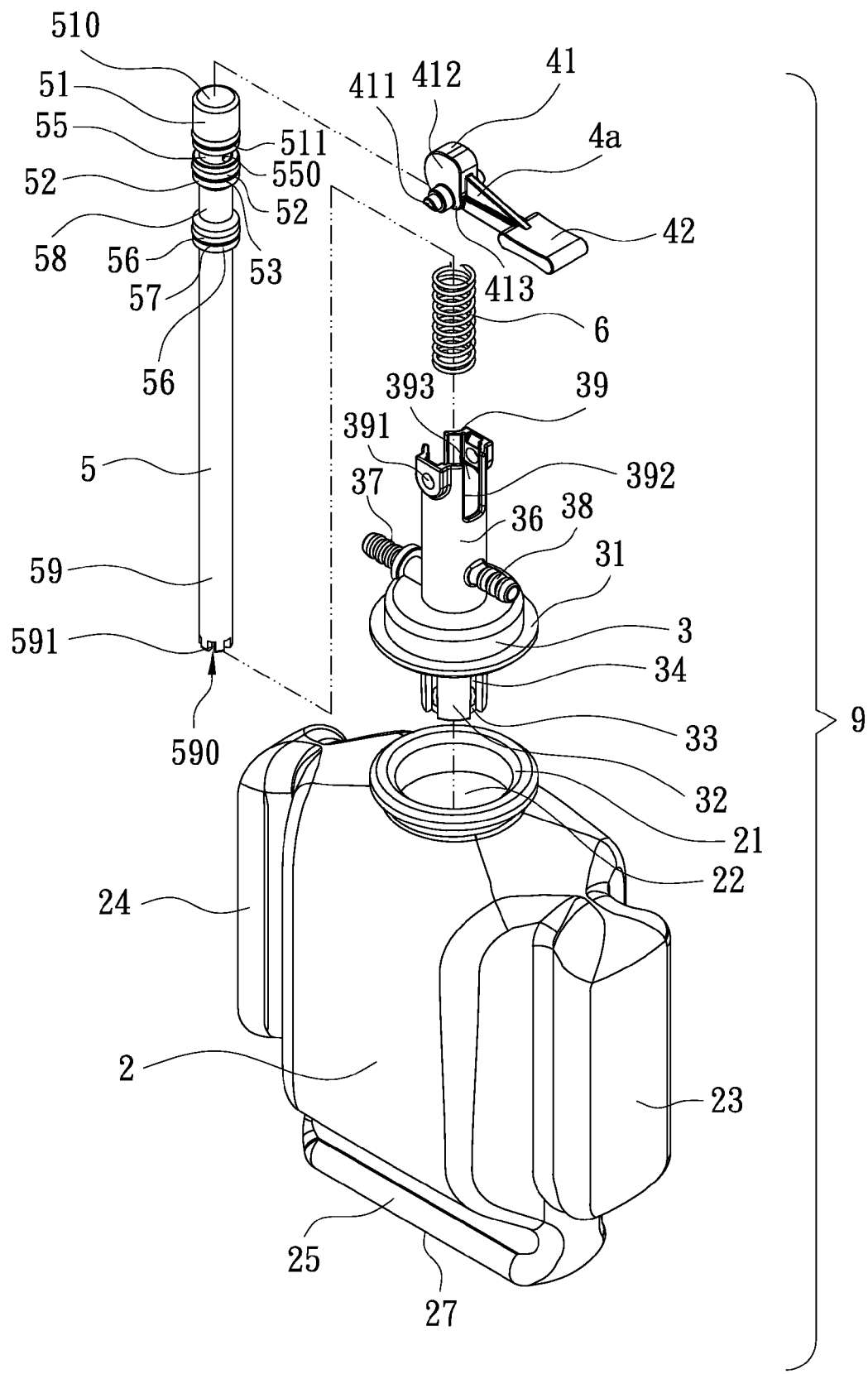
FIG. 3 shows an exploded view of the sealant dispensing unit of the embodiment of the present invention.
Figure 12:
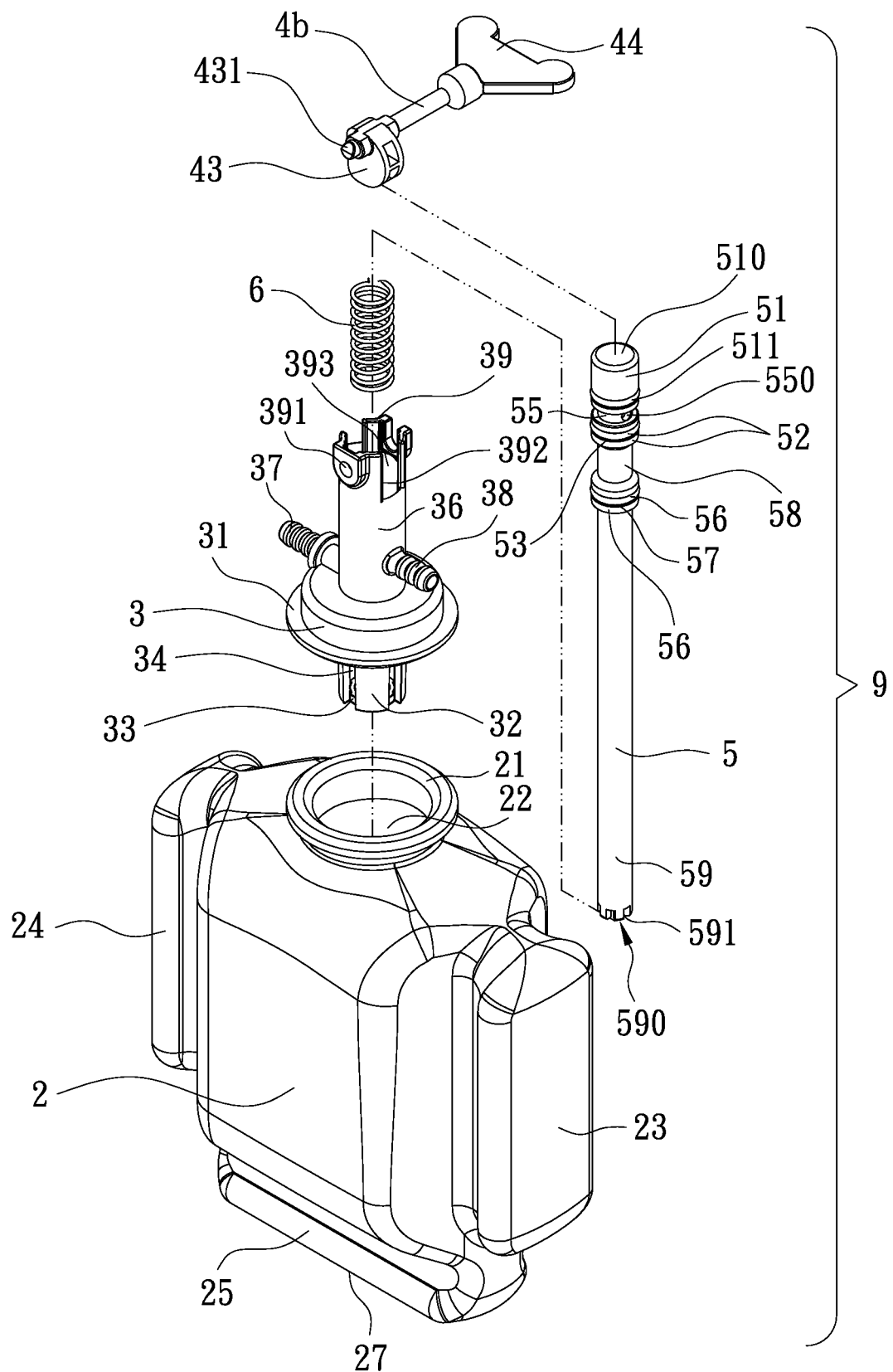
FIG. 12 shows an exploded view of a sealant dispensing unit of a second embodiment of the present invention.
Figure 13:
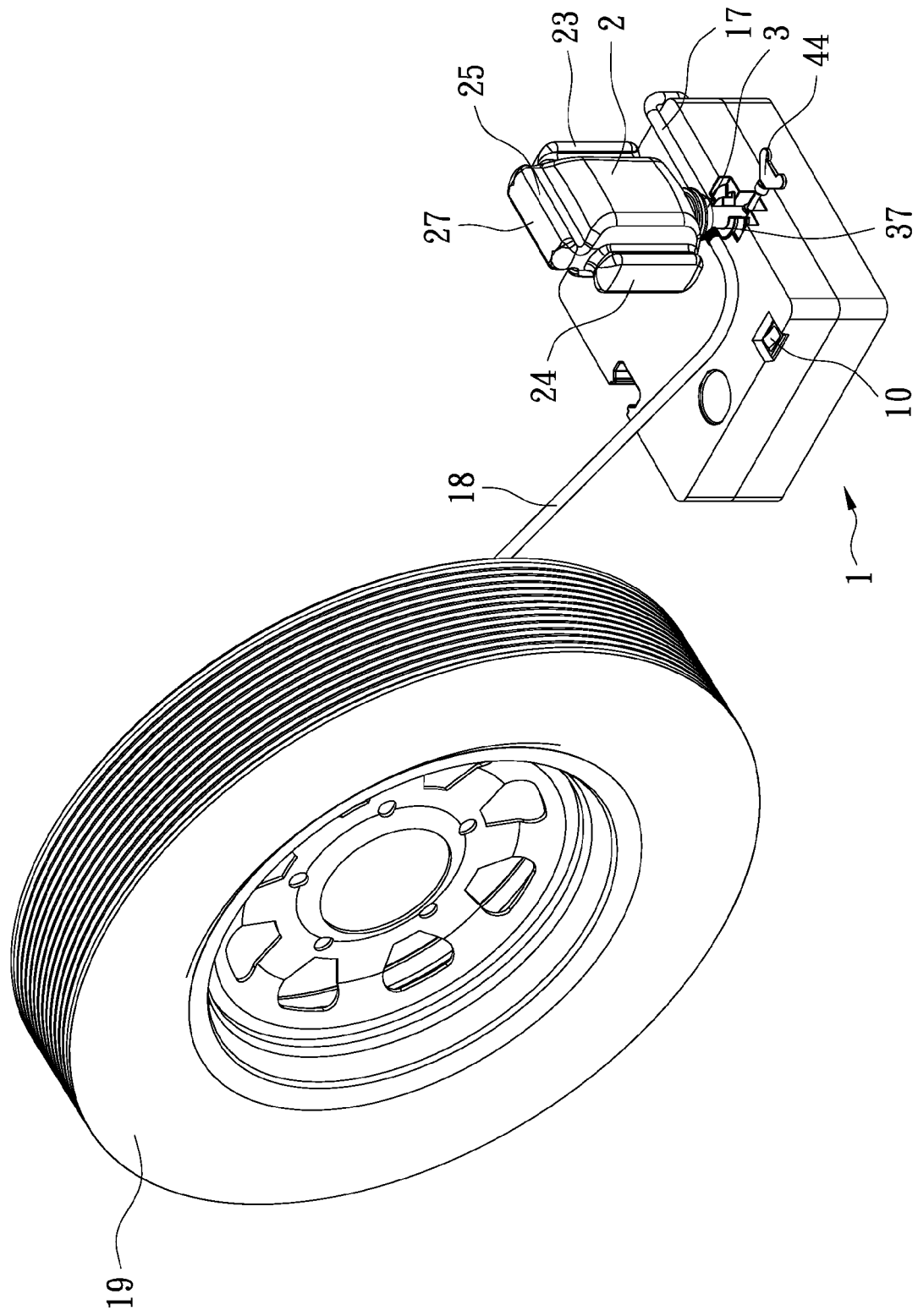
FIG. 13 shows a still further 3-dimensional application view of the present invention, wherein the sealant dispensing unit of the second embodiment is operated under inverted orientation.

A further feature of the present invention is that the serving element 4a can be used to control the displacement of the tube 5 to allow the sealant dispensing unit 9 to be used for only inflating a tire or for simultaneously repairing and inflating a tire. FIGS. 12 and 13 show another embodiment of the sealant dispensing unit 9, wherein most elements of the sealant dispensing unit 9 are the same as those shown in FIG. 3 except for the serving element. As shown in FIGS. 12 and 13, the serving element 4b is designed such that it can be operated to rotate about the pin hole 391 of the upper cylindrical pipe 36. In FIG. 3, the serving element 4a is operated to swing about the pin holes 391. Both of the serving element 4a and the serving element 4b provides the function of displacing the tube 5. As shown in FIGS. 12 and 13, one end of the serving element 4b is provided with a pivot pin 431 and a transverse eccentric cam 43 at the rear of the pivot pin 431. The other end of the serving element 4b is provided with a rotary handle 44, wherein the pivot pin 431 is pivotally connected to the pin hole 391 of the upper cylindrical pipe 36.

In view of the foregoing, the sealant dispensing unit 9 of the present invention can be installed to the supportive box 1 in upright orientation as well as inverted orientation to inflate or repair a tire, and this feature can facilitate an associated professional to perform various modes and designs of the supportive box in cooperation with the sealant dispensing unit 9. Furthermore, the first hose connector 37 and the second hose connector 38 of the sealant dispensing unit 9 can be used to serve as an inlet for the high-pressure air or an outlet for the chemical sealant 26. Furthermore, the tube 5 can be used to serve as a channel for the chemical sealant 26 or a channel for the high-pressure air. Furthermore, the serving element 4a and the serving element 4b are respectively provided with the eccentric cam 41 and the eccentric cam 43, both of which allows the tube 5 to be displaced for achieving the purpose of delivering the chemical sealant to repair a tire. The operation of the sealant dispensing unit 9 is very convenient.

The descriptions set forth as above illustrate simply preferred embodiments of the present invention and are not intended to limit the scope of the present invention. It is understood that any modification, replacement of equivalent parts and improvement by those skilled in the art are within the scope of the present invention without departing the spirit and principle of the invention hereinafter claimed

I claim:

1. Air compressor equipment, comprising:
a supportive box, in which a compressor unit being able to generate high-pressure air is provided; and
a sealant dispensing unit including two hose connectors, one of which is provided to receive the high-pressure air generated by the compressor unit and the other one of which is provided to convey the chemical sealant contained in the sealant dispensing unit to an object; whereby the sealant dispensing unit allows a user to select upright orientation or inverted orientation for an operation; when the sealant dispensing unit is operated in a different orientation, the functions of the two hose connectors will be changed accordingly, wherein the two hose connectors will serve as a channel for the high-pressure air or serve as a channel for the chemical sealant, wherein the sealant dispensing unit further includes a bottle and a cap, the bottle having a top opening and a bottom, the bottle defining therein an inner space for storing the chemical sealant that is used to repair a tire, the cap being able to combine with the bottle, the cap having a lower cylindrical pipe extending downwardly and an upper cylindrical pipe extending upwardly, the lower cylindrical pipe communicating with the upper cylindrical pipe, the lower cylindrical pipe defining multiple slots around its periphery, the lower cylindrical pipe being provided at its bottom with a circular bottom wall extending inwardly along a radial direction of the lower cylindrical pipe, the circular bottom wall defining a central circular opening communicating an inner passage of the lower cylindrical pipe, the upper cylindrical upper pipe having a top opening and being provided with the two hose connectors consisting of a first hose connector and a second hose connector; and wherein the sealant dispensing unit further includes a spring, which is inserted through the top opening of the upper cylindrical pipe and placed on the circular bottom wall at the bottom of the inner passage of the lower cylindrical pipe; and wherein the sealant dispensing unit further includes a tube with a predetermined length and an inner passage, the tube having a top segment provided with a closed top face and having a bottom segment defining a bottom opening, the top segment having a greater diameter than the bottom segment of the tube, the bottom segment defining multiple notches around its bottom periphery, the tube being provided with two upper, spaced-apart, annular protrusions and two lower, spaced-apart, annular protrusions between the top segment and the bottom segment, the upper and lower annular protrusions having a greater diameter than the bottom segment of the tube, between the top segment and the upper annular protrusions defining a first annular slot which has a smaller diameter than the bottom segment of the tube, the tube defining at the first annular slot a through hole by which the inner passage of the tube communicates with first annular slot, between the upper annular protrusions and the lower annular protrusions defining a second annular slot which has a smaller diameter than the bottom segment of the tube, between the two upper annular protrusions being provided with a first seal ring, between the two lower annular protrusions being provided with a second seal ring, the bottom segment of the tube being inserted to go through the top opening of the upper cylindrical pipe and go out of the central circular opening of the circular bottom wall of the lower cylindrical pipe so that the lower annular protrusions of the tube urge against a top end of the spring and thus located in the upper cylindrical pipe and the lower cylindrical pipe, so that between the cap and the first annular slot of the tube defines a first annular gap whereas between the cap and the second annular slot of the tube defines a second annular gap, both of the first and second annular gaps being displaceable with the tube; and wherein the sealant dispensing unit further includes a serving element being pivotally connected with at least one pin hole of the upper cylindrical pipe and urging against the closed top face of the top segment of the tube such that the tube is displaceable by operating the serving element.

2. The air compressor equipment of claim 1, wherein the upper cylindrical pipe defines two opposite mounting slots at its top opening, each mounting slot being open at its top and closed at its bottom, two opposite pin holes being located at the upper cylindrical pipe adjacent to the two mounting slots; and wherein one end of the serving element is provided with an eccentric cam having two pivot pins at its two sides, and the other end of the serving element is provided with an operating handle, the serving element being pivotally connected with the pin holes of the upper cylindrical pipe by the pivot pins, the eccentric cam of the serving element being located at the top opening of the upper cylindrical pipe and urging against the closed top face of the top segment of the tube, the serving element being able to be operated by the operating handle at the mounting slots of the upper cylindrical pipe to conduct a semicircle swing about the pivot pins.

3. The air compressor equipment of claim 1, wherein one end of the serving element is provided with a pivot pin and a transverse eccentric cam at the rear of the pivot pin, the other end of the serving element is provided with a rotary handle, wherein the pivot pin is pivotally connected to one pin hole of the upper cylindrical pipe.

* * * * *